United States Patent
Ragsdale et al.

(10) Patent No.: US 11,263,328 B2
(45) Date of Patent: Mar. 1, 2022

(54) ENCRYPTED LOG AGGREGATION

(71) Applicant: VMWARE, INC., Palo Alto, CA (US)

(72) Inventors: Ian Ragsdale, Atlanta, GA (US);
Saurabh Agrawal, Bangalore (IN);
Kartik Patel, Atlanta, GA (US);
Santhosh Chandrashekarappa Irani, Bangalore (IN)

(73) Assignee: VMWARE, INC., Palo Alto, CA (US)

(*) Notice: Subject to any disclaimer, the term of this patent is extended or adjusted under 35 U.S.C. 154(b) by 322 days.

(21) Appl. No.: 16/249,952

(22) Filed: Jan. 17, 2019

(65) Prior Publication Data
US 2020/0089896 A1 Mar. 19, 2020

(30) Foreign Application Priority Data
Sep. 13, 2018 (IN) .............................. 201841034496

(51) Int. Cl.
*G06F 21/62* (2013.01)
*G06F 21/60* (2013.01)
*H04L 9/08* (2006.01)
*H04L 9/32* (2006.01)

(52) U.S. Cl.
CPC ........ *G06F 21/602* (2013.01); *G06F 21/6227* (2013.01); *H04L 9/0861* (2013.01); *H04L 9/32* (2013.01)

(58) Field of Classification Search
CPC ........ G06F 21/60; G06F 21/602; G06F 21/62; G06F 21/6218; G06F 21/6227; H04L 9/0861; H04L 9/32
See application file for complete search history.

(56) References Cited

U.S. PATENT DOCUMENTS

| | | | | |
|---|---|---|---|---|
| 6,587,948 B1* | 7/2003 | Inazawa | ............ | G11B 7/24085 713/193 |
| 7,428,636 B1* | 9/2008 | Waldspurger | ......... | H04L 63/083 713/164 |
| 8,769,306 B1* | 7/2014 | Li | ........................ | H04L 9/0631 713/189 |
| 9,753,957 B1* | 9/2017 | Easttom, II | ........... | G06F 16/972 |
| 10,061,932 B1* | 8/2018 | Combs | .................. | G06F 3/1222 |
| 10,210,162 B1* | 2/2019 | Rees | ..................... | G06F 3/0631 |
| 2008/0092239 A1* | 4/2008 | Sitrick | .................. | H04L 9/0863 726/27 |
| 2008/0109372 A1* | 5/2008 | Bykov | .............. | G06Q 20/3821 705/71 |

(Continued)

OTHER PUBLICATIONS

Christof Rath, Usable Privacy-aware Logging for Unstructured Log Entries, 2016 11th International Conference on Availability, Reliability and Security (Year: 2016).*

*Primary Examiner* — Khang Do
(74) *Attorney, Agent, or Firm* — Thomas Horstemeyer, LLP (57) ABSTRACT

Disclosed are various examples for threat detection and security for edge devices in communication with Internet-of-Things (IoT) devices. In one example, a profile is associated with a virtual machine of a gateway device. The profile includes an expected behavior for the virtual machine. The virtual machine is executed by a hypervisor of the gateway device. An actual behavior for the virtual machine is determined. A remedial action is performed. The remedial action is based on an anomaly between the expected behavior and the actual behavior.

20 Claims, 3 Drawing Sheets

(56) References Cited

U.S. PATENT DOCUMENTS

| | | | | |
|---|---|---|---|---|
| 2011/0170687 A1* | 7/2011 | Hyodo | H04L 9/0637 | 380/200 |
| 2011/0295813 A1* | 12/2011 | Pickard | G06F 16/113 | 707/672 |
| 2013/0111016 A1* | 5/2013 | Wilson | H04L 67/22 | 709/224 |
| 2014/0372754 A1* | 12/2014 | Aissi | H04L 9/0861 | 713/168 |
| 2015/0244529 A1* | 8/2015 | Clayton | G06F 21/53 | 713/189 |
| 2015/0270974 A1* | 9/2015 | Lochmatter | H04L 9/3236 | 713/165 |
| 2015/0381365 A1* | 12/2015 | Garcia Morchon | H04L 9/0816 | 380/30 |
| 2016/0034442 A1* | 2/2016 | Levy | H04L 67/2823 | 709/203 |
| 2016/0070887 A1* | 3/2016 | Wu | G06F 21/84 | 713/189 |
| 2016/0104154 A1* | 4/2016 | Milov | G06Q 20/3278 | 705/67 |
| 2016/0119289 A1* | 4/2016 | Jain | H04L 63/0471 | 726/12 |
| 2017/0006064 A1* | 1/2017 | Agarwal | H04L 63/10 | |
| 2017/0078095 A1* | 3/2017 | Iyer | H04L 63/083 | |
| 2017/0103217 A1* | 4/2017 | Arasu | H04L 9/0637 | |
| 2017/0206174 A1* | 7/2017 | Keranen | H04L 9/0877 | |
| 2017/0230171 A1* | 8/2017 | Gadepally | G06F 16/258 | |
| 2017/0286698 A1* | 10/2017 | Shetty | G06F 16/182 | |
| 2018/0165225 A1* | 6/2018 | Horne | G06F 12/1408 | |
| 2018/0196723 A1* | 7/2018 | Patil | G06F 11/079 | |
| 2018/0314847 A1* | 11/2018 | Yeo | H04L 9/0631 | |
| 2019/0147170 A1* | 5/2019 | Keselman | G06F 16/245 | 713/189 |
| 2019/0149320 A1* | 5/2019 | Keselman | H04L 9/0861 | 380/279 |
| 2019/0158288 A1* | 5/2019 | Williamson | H04L 9/3213 | |

* cited by examiner

Sample log output - No Encryption

```
2018-07-17T22:39:20Z D [5368356] [TBAS] Made options request to Exchange
server
2018-07-17T22:39:20Z I [5364458] - AnalyticsProvider is nil
2018-07-17T22:39:20Z D [5368356] [TBAS] Made options request to Exchange
server
2018-07-17T22:39:20Z I [5368356] [TBAS] Exchange server version: 15.20          ←— 303a
2018-07-17T22:39:20Z I [5368356] [TBAS] Exchange server premise status:
306a —→ Off Premise
2018-07-17T22:39:20Z D [5368356] [TBAS] Received available commands
2018-07-17T22:39:20Z I [5368356] - SERVER : Microsoft-IIS/10.0                  ←— 309a
2018-07-17T22:39:20Z I [5368356] [TBAS] Negotiated version: 16.1                ←— 312a
2018-07-17T22:39:20Z D [5364228] - Status log for <TBActiveSyncClient:          ←— 315a
0x7fb4f247eb60, baseURL:
https://outlook.office365.com/Microsoft-Server-ActiveSync,
operationQueue: <TBASBlockingOperationQueue: 0x60000022Saa0>{name =
'com.getboxer.TBActiveSyncClient.standardQueue'}>
```

FIG. 3B

Sample log output - encrypted parameters

```
2018-07-17T22:39:20Z D [5368356] [TBAS] Made options request to Exchange
server
2018-07-17T22:39:20Z I [5364458] - AnalyticsProvider is nil
2018-07-17T22:39:20Z D [5368356] [TBAS] Made options request to Exchange
server
2018-07-17T22:39:20Z I [5368356] [TBAS] Exchange server version:
303b —→ {encrypted_string}
           2018-07-17T22:39:20Z I [5368356] [TBAS] Exchange server premise status:
306b —→ {encrypted_string}
           2018-07-17T22:39:20Z D [5368356] [TBAS] Received available commands
           2018-07-17T22:39:20Z I [5368356] - SERVER : {encrypted_string}          ←— 309b
           2018-07-17T22:39:20Z I [5368356] [TBAS] Negotiated version:
312b —→ {encrypted_string}
           2018-07-17T22:39:20Z D [5364228] - Status log for {encrypted_string}    ←— 315b
```

ENCRYPTED LOG AGGREGATION

RELATED APPLICATIONS

Benefit is claimed under 35 U.S.C. 119(a)-(d) to Foreign Application Serial No. 201841034496 filed in India entitled "ENCRYPTED LOG AGGREGATION", on Sep. 13, 2018, by VMware, Inc., which is herein incorporated in its entirety by reference for all purposes.

BACKGROUND

An enterprise can utilize a management service capable of protecting email, corporate documents, and other enterprise data from theft, data loss, and unauthorized access. The management service can provide various applications for the enterprise and end users associated with the enterprise. The enterprise can also provide applications for the end users through the management service. Errors that occur in an application can be debugged in order to ensure effectiveness of the applications and productivity of users.

In some cases, applications are not sufficiently tested in development cycles to provide completely error-free code. In addition, actual product usage can subject applications to additional scenarios that are not anticipated by the management service or the enterprise. Log files for the application can be useful for identifying error conditions and other issues with the operation of the application by end users. The log files can capture personally identifiable information and other parameters that end users of the application, or the enterprise, desires to maintain secured. Providing effective security solutions for log files can be costly in time and effort in an enterprise environment. Securely providing log files for debugging can include numerous back-and-forth communications with end users. Further, current solutions do not provide a way for end users or enterprises to ensure that the information in the log files is aggregated in a protected manner.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

FIGS. 3A-3B are drawings illustrating functionality implemented by components of the networked environment and rendered for display.

DETAILED DESCRIPTION

The present disclosure relates to encrypted log aggregation. Management services and enterprises can provide various applications for end users. The enterprise can also provide applications for the end users through the management service. Log files for the application can be useful for identifying error conditions and other issues with the operation of the application by end users. The log files can capture information that end users or the enterprise desires to maintain secured. Providing effective security solutions for log files can be costly in time and effort. However, the present application discloses systems and processes that can increase efficiency of using a client device by providing improved tools to selectively identify and protect particular parameters in log files. The systems and processes can securely encrypt selected parameters and aggregate log data that includes the encrypted parameters. This process allows a user to control access to the parameters. Current solutions do not provide a way for end users or enterprises to ensure that selected parameters in the log files are encrypted and aggregated in a protected manner.

Figure 1:
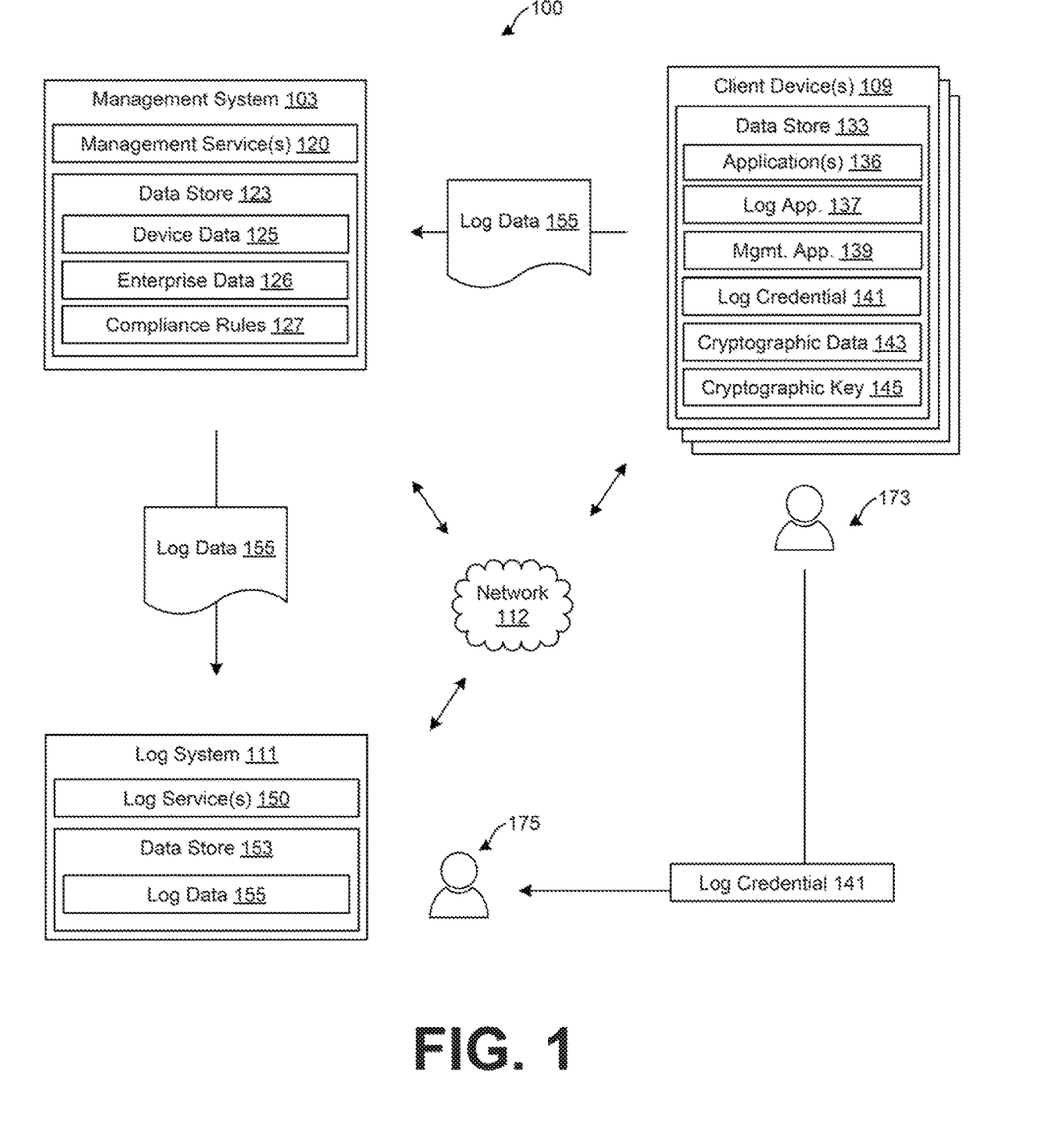
FIG. 1 is a drawing of an example of a networked environment, including a management system, a client device, and a log system.

With reference to FIG. 1, shown is an example of a networked environment 100. The networked environment 100 can include a management system 103, a client device 109, and log system 111 in communication with one another over a network 112. While shown as separate components, the log system 111 and functionalities discussed regarding the log system 111 can be provided by the management system 103. The components of the networked environment 100 can be utilized to provide encrypted log aggregation.

The network 112 can include the Internet, intranets, extranets, wide area networks (WANs), local area networks (LANs), wired networks, wireless networks, other suitable networks, or any combination of two or more such networks. The networks can include satellite networks, cable networks, Ethernet networks, telephony networks, and other types of networks.

The management system 103 can include a server computer or any other system providing computing capability. While referred to in the singular, the management system 103 can include a plurality of computing devices that are arranged in one or more server banks, computer banks, or other arrangements. The management system 103 can include a grid computing resource or any other distributed computing arrangement. The management system 103 can be customer or enterprise-specific. In some embodiments, the management system can be part of a local network, and can be local to at least one of the other components of the networked environment. In other embodiments, the management system 103 can be remote from the other components, or the computing devices of the management system 103 can be located in a single installation or can be distributed among many different geographical locations local and/or remote from the other components. The management system 103 can also include or be operated as one or more virtualized computer instances. For purposes of convenience, the management system 103 is referred to herein in the singular. Even though the management system 103 is referred to in the singular, it is understood that a plurality of management systems 106 can be employed in the various arrangements as described above. The components executed on the management system 103 can include a management service 120 as well as other applications, services, processes, systems, engines, or functionality not discussed in detail herein. The management service 120 can be stored in the data store 123 of the management system 103.

The data store 123 can include any storage device or medium that can contain, store, or maintain the instructions, logic, or applications described herein for use by or in connection with the instruction execution system. The data store 123 can be a hard drive or disk of a host, server computer, or any other system providing storage capability. While referred to in the singular, the data store 123 can include a plurality of storage devices that are arranged in one or more hosts, server banks, computer banks, or other arrangements. The data store 123 can include any one of many physical media, such as magnetic, optical, or semiconductor media. More specific examples include solid-state drives or flash memory.

The data store 123 can include memory of the management system 103, mass storage resources of the management system 103, or any other storage resources on which data can be stored by the management system 103. The data stored in the data store 123 can include, for example, management data including device data 125, enterprise data 126, compliance rules 127, as well as other data.

The data stored in the data store 123 can be associated with the operation of the various applications and/or functional entities described. Device data 125 can include data associated with a configuration of each client device 109, and can include an identifier of the client device 109. The identifier can be a serial number, media access control (MAC) address, other network address, or another device identifier. In addition, the device data 125 can include an enrollment status indicating whether each client device 109 is enrolled with or managed by the management service 120. A client device 109 designated as "enrolled" can be permitted to access the enterprise data 126, while a client device 109 designated as "not enrolled," or having no designation, can be denied access to the enterprise data 126.

Additionally, device data 125 can include indications of the state of devices including the client devices 109. For instance, these indications can specify applications that are installed on the client devices 109; configurations or settings that are applied to each of the devices, user accounts associated with each of the devices; the physical locations of each of the devices; the network to which each of the devices is connected; and other information describing the current state of each of the devices.

Device data 125 can also include data pertaining to user groups. An administrator can specify one or more of the client devices 109 as belonging to a user group. The user group can refer to a group of user accounts with the management service 120. User groups can be created by an administrator of the management service 120 such that a batch of client devices 109 can be configured according to common settings. For instance, an enterprise can create a user group for the marketing department and the sales department, where client devices 109 in the marketing department are configured differently from the client devices 109 in the sales department.

Compliance rules 127 can include, for example, configurable criteria that must be satisfied for an enrolled one of the client devices 109 to be in compliance with the management service 120. The compliance rules 127 can be based on a number of factors, including geographical location, activation status, enrollment status, and authentication data including authentication data obtained by a device registration system, time, and date, and network properties, among other factors associated with each device. The compliance rules can also be determined based on a user account associated with a user.

The management service 120 can oversee the management of devices including the client devices 109. The management service 120 can oversee aggregation of encrypted logs for applications 136 executed on a client device 109. The management service 120 can provide functionality using application program interfaces (APIs). APIs or API calls can be provided for other functionalities of the management service 120 as discussed herein. For example, the management service 120 can expose an API that the client device 109 can invoke to transmit log data 155 to the management service 120. This can be considered a log upload service for applications 136 or management applications 139 to send log files.

In some cases, the management service 120 can provision an API key such as an encrypted key, a character string, or another parameter for a particular customer. The API key can allow a client device 109 to upload log files to an aggregated log for a particular enterprise or customer. The management service 120 or the log service 150 can generate and provide a user interface for access and management of the log data 155. The user interfaces of the management service 120 and/or the log service 150 can be accessed through management application 139 or another application 136 of a client device 109. The user interfaces generated by the management service 120 and/or the log service 150 can also be accessed through a network site provided by the management service 120.

The management service 120 can receive the log data 155 from the client device 109. The management service 120 can transmit the log data 155 to the log service 150 for analysis and categorization. The log service 150 can index the log data 155 to generate searchable log data 155. The log service 150 can expose an API that the client device 109 can invoke to query indexed log data 155 for particular search terms, parameters, or errors. The log data 155 can be searchable according to client device 109, for example, by device identifier, according to application 136, type of error, and other categories.

The management service 120 can also request that the client device 109 check-in using a notification service like APPLE® Push Notification Service (APNS), GOOGLE® Cloud Messaging (GCM), WINDOWS® Push Notification Services (WNS), or AirWatch® Cloud Messaging (AWCM). For example, the management service 120 can transmit a request to the notification service, which requests that the client device 109 check-in with the management service 120. The notification service can push or otherwise route a notification to the client device 109. Once the notification is received, the management application 139 can cause the client device 109 to check-in with the management service 120. The management application 139 can determine whether a command queue provided by the management service 120 for the respective client device 109 contains any commands or resources for the client device 109, and, if so, can cause the commands or resources to be downloaded and/or implemented on the client device 109.

The client device 109 can be representative of one or more client devices 109. The client device 109 can include a processor-based system, such as a computer system, that can include a desktop computer, a laptop computer, a personal digital assistant, a cellular telephone, a smartphone, a set-top step, a music player, a tablet computer system, a game console, an electronic book reader, a smartwatch, or any other device with like capability. The client device 109 can have an operating system that can perform functionalities and execute applications. The operating system can be stored in a data store 133 that also includes applications 136, a log application 137, a management application 139, log credential 141, cryptographic data 143, and other data. The client device 109 can execute the management application 139 to perform or access the functionality described for the management service 120.

The client device 109 can also be equipped with networking capability or networking interfaces, including a localized networking or communication capability, such as a near-field communication (NFC) capability, radio-frequency identification (RFID) read or write capability, or other localized communication capability. In some embodiments, the client device 109 is mobile where the client device 109 is easily portable from one location to another, such as a smart phone, tablet, or laptop computer. In other situations, the client device 109 can be a desktop machine or a kiosk that is not easily portable.

The operating system of the client device 109 can be configured to execute various applications 136, including a log application 137 and a management application 139. The operating system and some applications 136 can access network content served up by the management system 103, or other servers, thereby rendering a user interface on a display, such as a liquid crystal display (LCD), organic light emitting diode (OLED) display, touch-screen display, or other type of display device.

To this end, some applications 136 can include a browser or a dedicated application, and a user interface can include a network page, an application screen, or other interface. The client device 109 can also access web applications using the browser application. Further, other applications 136 can include enterprise-specific applications, device management applications, social networking applications, word processors, spreadsheet applications, media player applications, or other applications.

The management application 139 can perform actions as directed by the management service 120, for instance, by checking in with the management service 120, retrieving a command from the command queue, and implementing the command as discussed above.

The log application 137 can generate secured log data 155 and transmit it for aggregation by the management service 120 or the log service 150. The log application 137 can be a separate application, or can be a component of an application 136 or the management application 139. The log application 137 can automatically generate a log credential 141. In some cases, the credential 141 is generated in response to the application 136 or log application 137 being installed. The log credential 141 can be a password, character string, or another credential that can provide access to encrypted parameters within log data 155 generated by the log application 137. The log credentials 141 can be unencryption credentials to unencrypt log data 155 accessed through a user interface of the log service 150. The log credential 141 can be generated according to a predetermined specification. For example, a log credential 141 can be generated to include a number of characters, and to include one or more types of characters such as lowercase letters, uppercase letters, numbers, and special characters. The log credential 141 can be stored in a secured data location of the data store 133, so that a user credential is required to access the automatically generated log credential 141. The log application 137 can also generate a user interface element that displays the log credential 141 for a user of the client device 109 to view. The user 173 of the client device 109 can provide the user 175, such as an administrative user, with the log credential 141. The user 173 can provide the user 175 with the log credential 141 off the band, such as over the phone, in person, or by another method. In this way, the log service 150 does not have the log credential 141, so the encrypted parameters remain secured until the log credential 141 is provided to the user 175 or otherwise entered through a user interface element of the log service 150.

The user 173 can also access the log data 155 through a user interface of a web application or network site generated by the log service 150. In other cases, the log data 155 can be transmitted to the client device 109 to be reviewed. The user 173 can view the log data 155. The user interface can color, highlight, or otherwise identify text that is encrypted when the credential 141 is not entered, but is unencrypted when the log credential 141 is entered. In some cases, the user 173 can log in with a user credential as well as the log credential 141, in order to for the user interface to show the color-coded or highlighted text that is encrypted when the credential 141 is not entered, but is unencrypted when the log credential 141 is entered. In this way, the user 173 can determine whether or not the information should be shared, and whether to provide the user 175 with the log credential 141.

The user 175 can also access the network site or web application and view the logs. If the user 175 does not have access to the logs, some log data will be encrypted. However, if the user 173 has provided the log credential 141 to the user 175, the user 175 can enter the log credential, and the log service 150 will unencrypt the log data 155 based on the log credential 141.

The log application 137 can generate cryptographic data 143. The cryptographic data 143 can be generated and associated with the particular log credential 141. If a new log credential 141 is generated, new cryptographic data 143 can be generated. The cryptographic data 143 can include a key derivation function, at least one initialization vector, a random salt, a number of iterations, and a key length. The initialization vector can be a specific initialization vector for each datatype or format of parameter to be encrypted. For example, a parameter can be a string, integer, double, boolean, or character. Each datatype can have its own initialization vector. The initialization vector can be fixed-length and random or pseudorandom. The log application 137 can determine a type of a parameter to be encrypted, and reuse the initialization vector for each parameter that has that datatype. The number of iterations can be a predetermined number, a user-selected number, or a random number over a predetermined minimum number of iterations. The key derivation function can be password-based key derivation function two (PBKDF2) or another key derivation function. The random salt can be random data. The log application 137 can also specify a type of encryption, such as a particular block cipher. The block cipher can be Advanced Encryption Standard (AES)-256 CBC or another symmetrical or asymmetrical type of encryption.

The log application 137 can generate a cryptographic key 145 based on the cryptographic data 143. For example, the log application 137 can provide the log credential 141, the datatype-based initialization vector, the salt, the number of iterations, and the key length as input parameters for the key derivation function to generate the cryptographic key 145.

The log application 137 can save the cryptographic data 143 to the data store 133. For example, the initialization vector(s) and the salt can be stored to an access-restricted location of the data store 133. The access-restricted location can be restricted based on a unique identifier of an application 136, or an identifier of a developer of the application 136, such as an identifier associated with the management service 120 or an enterprise identifier. The initialization vector(s) and the salt can be stored to SharedPreferences in an Android® based client device 109, or to a shared keychain in an iOS® based client device 109. In some cases, the SharedPreferences or shared keychain can be considered an access-restricted location. The additional cryptographic data 143 can also be stored in the data store 133.

The log application 137 can transmit log data 155 during a debugging session is on, or, or based on logging rules. The logging rules can specify certain errors and exceptions that should be transmitted if detected. For example, the logging rules can initialize the debugging session based on detection of a predetermined set of events in the application 136.

The cryptographic key 145 can be stored in temporary memory but not stored durably on the client device 109. The cryptographic key 145 can be regenerated if needed, based on the cryptographic data 143, the initialization vector, the salt, and the log credential 141.

The log application 137 can also provide a user interface element that when selected causes the existing log credential 141 to clear the existing log credential 141 and generate an updated log credential 141. Log data 155 transmitted after the log credential 141 is regenerated will use the updated log credential 141. The log application 137 can write log data 155 to the data store 133 or stream the log data 155 to the management service 120 or the log service 150. Streaming the log information can save data by reducing disk read write or input output operations.

Figure 2:
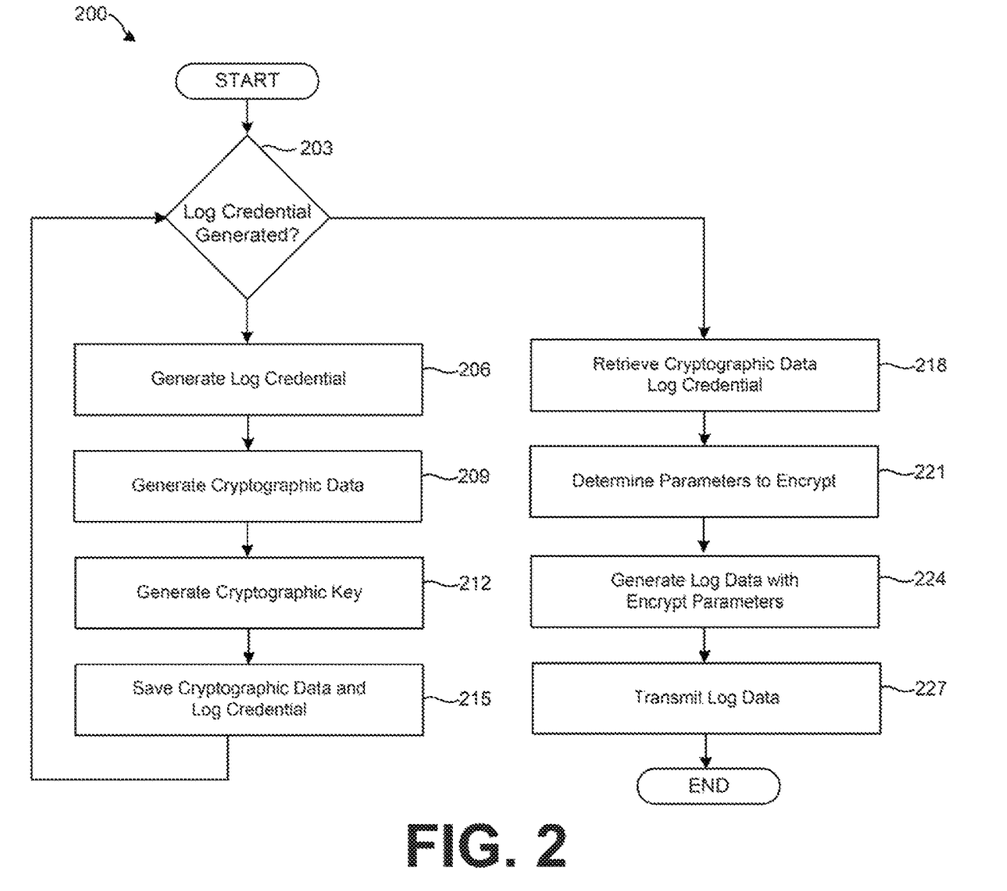
FIG. 2 is an example flowchart illustrating functionality implemented by components of the networked environment.

In FIG. 2, shown is an example sequence diagram 200 describing steps that can be performed by the components of the networked environment 100. Generally, the sequence diagram 200 describes how the components securely encrypt selected parameters and provide log data 155 to the log service 150 through the management service 120.

In step 203, the log application 137 can determine whether a log credential 141 has been generated. For example, the log application 137 can perform a check of a secured location of the data store 133 or a remote data location to identify whether the log credential 141 is stored. If a log credential 141 is not found, the log application 137 can proceed to step 206. If a log a log credential 141 is found, the log application 137 can proceed to step 218.

In step 206, the log application 137 can automatically generate a log credential 141. The log credential 141 can be automatically generated based on a predetermined number of characters and a predetermined set of characters. The log credential 141 an also be generated to include one or more character types, such as lowercase letters, uppercase letters, numbers, and special characters such as non-letter and non-number characters.

In step 209, the log application 137 can also generate cryptographic data 143. The cryptographic data 143 can be associated with the automatically generated log credential 141. The cryptographic data 143 can include random data or pseudorandom data such as an initialization vector and a salt. The cryptographic data 143 can also include a number of cryptographic specifications such as a key derivation function, a number of iterations, and a key length. The initialization vector can be a specific initialization vector for each datatype or format of parameter to be encrypted. For example, a parameter can be a string, integer, double, boolean, or character datatype, each with an associated initialization vector. The number of iterations can be a predetermined number, a user-selected number, or a random number over a predetermined minimum number of iterations. The key derivation function can be password-based key derivation function two (PBKDF2) or another key derivation function. The salt can be random or pseudorandom data. The log application 137 can also specify a type of encryption, such as a particular block cipher. The block cipher can be AES-256 CBC, or another symmetrical block-cipher algorithm.

In step 212, the log application 137 can generate a cryptographic key 145 based on the cryptographic data 143. For example, the log application 137 can provide the log credential 141, the datatype-based initialization vector, the salt, the number of iterations, and the key length as input parameters for the key derivation function to generate the cryptographic key 145.

In step 215, the log application 137 can save the log credential 141 and the cryptographic data 143 to the data store 133. Specifically, the log application 137 can save the log credential 141 to a password or credential secured location of the data store 133. The secured so that a user credential is required to access the automatically generated log credential 141. The user credential to access the secured location can be a credential used to access the client device 109, or in other cases can be a user credential associated with a user account with the management service 120.

The log application 137 can save the initialization vector(s) to the data store 133. The initialization vector(s) and the salt can be stored to SharedPreferences in an Android® based client device 109, or to a shared keychain in an iOS® based client device 109. In some cases, the SharedPreferences or shared keychain can be considered an access-restricted location. The additional cryptographic data 143 can also be stored in the data store 133. An access-restricted location can be restricted based on a unique identifier of an application 136, or based on an identifier of a developer of the application 136.

In step 218, where the log application 137 determines that the log credential 141 is generated, the log application 137 can retrieve log credential 141 and cryptographic data 143 from the data store 133. For example, the salt and the initialization vector(s) can be retrieved from an access-restricted location, or another location of the data store 133 as discussed. The log credential 141 can be retrieved from the password-secured location.

In step 221, the log application 137 can determine parameters to encrypt. In one example, the log application 137 can automatically encrypt all parameters that are variables to be included in the log data 155. In this way, the logs can be encrypted efficiently and with minimal user intervention. However, a user can also select particular parameters to be unencrypted. For example, the user can determine that a particular parameter does not include personally identifiable information, or can determine that this particular information is not of concern. In some examples, the log application 137 can specify certain parameters that will remain encrypted, regardless of a user selection. The log application 137 can restrict the user from marking these parameters to be unencrypted.

The log application 137 can prevent encryption in a number of ways. In a first example, a log method can shadow existing methods for log levels. For example, a Log.i method can result in parameters being encrypted, while Log.iu will have parameters unencrypted, Log.e method can result in parameters being encrypted, while Log.eu will have parameters unencrypted, and so on. For objective c, different macros to encrypt parameters or leave them unencrypted.

In a further example, a parameter can be wrapped using generics to mark that the particular parameter shouldn't be encrypted. This can provide parameter level flexibility to encrypt or not encrypt the parameter, for example, in each iteration of the parameter in log data 155. Alternatively, a parameter can be annotated to mark that it should escape encryption.

A format specification can also be introduced. For example, formats like "us," and "ud" can be introduced for string and int, respectively to not encrypt the parameter, while the default format specifier will encrypt the parameter. For example: Log.i("This is log % us for the user % s email", "abc", "xyz"). In this example, case "abc" can be prevented from encryption based on the annotation "% us," while "xyz" can be encrypted based on the annotation "% s."

The log application 137 can also handle encrypting parameters where a method can include parameters in long strings in log statements. In these situations, a script can be used to parse the string to identify a particular parameter, and convert the string to include the parameter as a separate argument to the method. For example the method Log.i("log statement where"+parameter+"is in the string") can be converted to a new method Log.i("log statement where % s is in the string", parameter).

In step 224, the log application 137 can generate log data 155 with encrypted parameters. For example, the log application 137 can analyze the operation of an application 136, and generate an initial log data that includes items such as a version of the application 136, a version of the client device 109 operating system, an operation being performed by the application, a URL or other network address associated with the operation, a username, a device identifier and other data. The log can include a number of variables. The variables can identify each of these items. Each variable can also be associated with a datatype, such as string, integer, double, boolean, character, or other datatypes.

The log application 137 can identify a variable from the initial log data, and can determine a datatype associated with that variable. The log application 137 can encrypt the variable based on a datatype-specific initialization vector and an encryption method such as AES-256 CBC, or another symmetric block-cipher algorithm. This process can be repeated for each variable and each datatype-specific initialization vector.

In step 227, the log application 137 can transmit log data 155 to the management service 120. The log application 137 can transmit a request comprising the log data 155 to the management service 120. The request can include, as request parameters, the initialization vector for each datatype, and the salt. An example request with an initialization vector for integer variables, string variables, an double variables, and a salt as parameters can include "/rest/uploadlog?iv_int=xyz&iv_.string=abc&iv_double=mno&salt=a12b," where iv_int can specify the initialization vector for integer variables, iv_string can specify the initialization vector for string variables, iv_double can specify the initialization vector for double variables.

Example log data 155 generated by the client device 109 can be "2018-07-24T04:35:35.960Z I [30663-BoxerWorker-6]—requestSync EmailProvider Account name=$% s##W+JS3kzHsF1p3oND1GbYxJUfdtJBHC/agbYTMz- L16Uz8=##type=com.boxer.exchange." In this example, the account name, identified after "Account name=," can be an encrypted string. The formatting provided by the client device 109 can be $%<data_type>##<base64(Encrypted_String)>##, for a base64 encoded encrypted string.

The management service 120 or log service 150 can modify the log data 155 to include an application identifier, a log identifier, the initialization vector for the variable, and the salt. The modified log data 155 can be "2018-07-24T04:35:35.960Z Boxer_Android 930a0029225aa4c28b-8ef095b679285e I [30663-BoxerWorker-6]—requestSync EmailProvider Account name=##a12b:abc:W+JS3kzH-F1p3oND1GbYxJUfdJBHC/agbYTMz LI6Uz8=##type=com.boxer.exchange." in this example, the application identifier and log identifier are added at the beginning, while the format for the encrypted string is updated to be ##<salt>:<IV>:<base64(Encrypted_String)>##.

FIG. 3A shows a sample unencrypted log output 300a. As seen in the unencrypted log output 300a, an application version 303a, a premises status 306a, a web server identifier 309a, a version 312a, and additional data 315a, including a URL and other data, are unencrypted. The log output 300a can be provided by the log service 150 if the log credentials 141 are provided when accessing the network site or web application of the log service 150.

FIG. 3B shows a sample encrypted log output 300b. As seen in the encrypted log output, application version 303a of FIG. 3A is instead identified as identifier 303b "{encrypted string}," which denotes the parameter is not available for viewing. The actual encrypted string can alternatively be shown. Likewise, the premises status 306a, the web server identifier 309a, the version 312a, and the additional data 315a, are each encrypted, and the user interface shows identifiers 306b, 309b, 312b, and 315b, which denote that the respective parameter is not available for viewing.

The log service 150 can provide a user interface element through which the log credentials 141 can be entered. Once the log credentials 141 are entered, the log service 150 will decrypt the encrypted parameters and replace the encrypted parameters with unencrypted parameters as shown in FIG. 3A. In some examples, a javascript embedded in bookmarklet which can prompt a user for a password to decrypt the contents loaded on webpage. The bookmarklet javascript can be custom made for different log aggregation solutions. For eg. Bookmarklet written for a particular log service 150 may not work on another log service 150.

A number of software components are stored in the memory and executable by a processor. In this respect, the term "executable" means a program file that is in a form that can ultimately be run by the processor. Examples of executable programs can be, for example, a compiled program that can be translated into machine code in a format that can be loaded into a random access portion of one or more of the memory devices and run by the processor, code that can be expressed in a format such as object code that is capable of being loaded into a random access portion of the one or more memory devices and executed by the processor, or code that can be interpreted by another executable program to generate instructions in a random access portion of the memory devices to be executed by the processor. An executable program can be stored in any portion or component of the memory devices including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

Memory can include both volatile and nonvolatile memory and data storage components. Also, a processor can represent multiple processors and/or multiple processor cores, and the one or more memory devices can represent multiple memories that operate in parallel processing circuits, respectively. Memory devices can also represent a combination of various types of storage devices, such as RAM, mass storage devices, flash memory, or hard disk storage. In such a case, a local interface can be an appropriate network that facilitates communication between any two of the multiple processors or between any processor and any of the memory devices. The local interface can include additional systems designed to coordinate this communication, including, for example, performing load balancing. The processor can be of electrical or of some other available construction.

The client devices 109 can include a display upon which a user interface generated by an application 136, management service 120, or another application can be rendered. In some examples, the user interface can be generated with user interface data provided by the management system 103. The client devices 109 can also include one or more input/output devices that can include, for example, a capacitive touchscreen or other type of touch input device, fingerprint reader, or keyboard.

Although the management service 120, applications 136, and other various services and functions described can be embodied in software or code executed by general purpose hardware as discussed above, as an alternative the same can also be embodied in dedicated hardware or a combination of software/general purpose hardware and dedicated hardware. If embodied in dedicated hardware, each can be implemented as a circuit or state machine that employs any one of or a combination of a number of technologies. These technologies can include discrete logic circuits having logic gates for implementing various logic functions upon an application of one or more data signals, application specific integrated circuits (ASICs) having appropriate logic gates, field-programmable gate arrays (FPGAs), or other components.

The flowcharts show an example of the functionality and operation of an implementation of portions of components described. If embodied in software, each block can represent a module, segment, or portion of code that can include program instructions to implement the specified logical function(s). The program instructions can be embodied in the form of source code that can include human-readable statements written in a programming language or machine code that can include numerical instructions recognizable by a suitable execution system such as a processor in a computer system or other system. The machine code can be converted from the source code. If embodied in hardware, each block can represent a circuit or a number of interconnected circuits to implement the specified logical function(s).

Although the flowcharts show a specific order of execution, it is understood that the order of execution can differ from that which is depicted. For example, the order of execution of two or more blocks can be scrambled relative to the order shown. Also, two or more blocks shown in succession can be executed concurrently or with partial concurrence. Further, in some embodiments, one or more of the blocks shown in the drawings can be skipped or omitted.

Also, any logic or application described that includes software or code can be embodied in any non-transitory computer-readable medium for use by or in connection with an instruction execution system such as a processor in a computer system or other system. In this sense, the logic can include, for example, statements including instructions and declarations that can be fetched from the computer-readable medium and executed by the instruction execution system. In the context of the present disclosure, a "computer-readable medium" can be any medium that can contain, store, or maintain the logic or application described for use by or in connection with the instruction execution system.

The computer-readable medium can include any one of many physical media, such as magnetic, optical, or semiconductor media. More specific examples of a suitable computer-readable medium include solid-state drives or flash memory. Further, any logic or application described can be implemented and structured in a variety of ways. For example, one or more applications can be implemented as modules or components of a single application. Further, one or more applications described can be executed in shared or separate computing devices or a combination thereof. For example, a plurality of the applications described can execute in the same computing device, or in multiple computing devices.

It is emphasized that the above-described embodiments of the present disclosure are merely possible examples of implementations described for a clear understanding of the principles of the disclosure. Many variations and modifications can be made to the above-described embodiments without departing substantially from the spirit and principles of the disclosure. All such modifications and variations are intended to be included within the scope of this disclosure.

What is claimed is:

1. A system, comprising:
   a client device; and
   a data store comprising instructions, wherein the instructions, when executed by a processor, cause the client device to at least:
      generate, by a log application installed on the client device, log access credentials and cryptographic data, the cryptographic data comprising: a plurality of datatype-specific initialization vectors, and a salt, wherein a respective datatype-specific initialization vector is associated with a corresponding one of a plurality of datatypes;
      generate, by the log application, log data for an application executed by the client device, the log data comprising a parameter that is identified as a variable of a particular datatype of the plurality of datatypes;
      encrypt, by the log application, the parameter as an encrypted string within the log data, wherein the parameter is encrypted using an initialization vector corresponding to the particular datatype based on the parameter being identified as the variable of the particular datatype;
      transmit, from the client device to a network service, a log data submission request comprising: the log data that includes the encrypted string and a plurality of request parameters, the request parameters comprising: the plurality of datatype-specific initialization vectors, and the salt; and
      render the log access credentials generated by the log application for display on the client device to enable a user of the client device to control access to encrypted portions of the log data.

2. The system of claim 1, wherein the network service requires log access credentials to decrypt and view the encrypted portions of the log data that are encrypted using the plurality of datatype-specific initialization vectors and the salt, and the request to submit the log data lacks the log access credentials.

3. The system of claim 1, wherein the cryptographic data further comprises a key derivation function, a specified number of iterations, and a key length.

4. The system of claim 1, wherein the parameter is encrypted based on a cryptographic key, and the cryptographic key is generated based on: the log access credentials, the respective datatype-specific initialization vector, and the salt.

5. The system of claim 1, wherein the parameter is encrypted based on: a symmetrical algorithm, and a cryptographic key.

6. The system of claim 5, wherein the instructions, when executed by the processor, cause the client device to at least:
generate the cryptographic key based on: the log access credentials, the respective datatype-specific initialization vector, and the salt.

7. The system of claim 6, wherein the encrypted string is unencryptable based on the log access credentials.

8. A method performed by a client device, the method comprising:
generating, by a log application installed on the client device, log access credentials and cryptographic data, the cryptographic data comprising: a plurality of datatype-specific initialization vectors, and a salt, wherein a respective datatype-specific initialization vector is associated with a corresponding one of a plurality of datatypes;
generating, by the log application, log data for an application executed by the client device, the log data comprising a parameter that is identified as a variable of a particular datatype of the plurality of datatypes;
encrypting, by the log application, the parameter as an encrypted string within the log data, wherein the parameter is encrypted using an initialization vector corresponding to the particular datatype based on the parameter being identified as the variable of the particular datatype;
transmitting, from the client device to a network service, a log data submission request comprising: the log data that includes the encrypted string and a plurality of request parameters, the request parameters comprising: the plurality of datatype-specific initialization vectors, and the salt; and
rendering the log access credentials generated by the log application for display on the client device, to enable a user of the client device to control access to encrypted portions of the log data.

9. The method of claim 8, wherein the network service requires log access credentials to decrypt and view the encrypted portions of the log data that are encrypted using the plurality of datatype-specific initialization vectors and the salt, and the request to submit the log data lacks the log access credentials.

10. The method of claim 8, wherein the cryptographic data further comprises a key derivation function, a specified number of iterations, and a key length.

11. The method of claim 8, wherein the parameter is encrypted based on a cryptographic key, and the cryptographic key is generated based on: the log access credentials, the respective datatype-specific initialization vector, and the salt.

12. The method of claim 8, wherein the parameter is encrypted based on: a symmetrical algorithm, and a cryptographic key.

13. The method of claim 12, further comprising:
generating the cryptographic key based on: the log access credentials, the respective datatype-specific initialization vector, and the salt.

14. The method of claim 12, wherein the encrypted string is unencryptable based on the log access credentials.

15. A non-transitory computer-readable medium embodying executable instructions, wherein the instructions, when executed by a processor, cause a client device to at least:
generate, by a log application installed on the client device, log access credentials and cryptographic data, the cryptographic data comprising: a plurality of datatype-specific initialization vectors, and a salt, wherein a respective datatype-specific initialization vector is associated with a corresponding one of a plurality of datatypes;
generate, by the log application, log data for an application executed by the client device, the log data comprising a parameter that is identified as a variable of a particular datatype of the plurality of datatypes;
encrypt, by the log application, the parameter as an encrypted string within the log data, wherein the parameter is encrypted using an initialization vector corresponding to the particular datatype based on the parameter being identified as the variable of the particular datatype;
transmit, from the client device to a network service, a log data submission request comprising: the log data that includes the encrypted string and a plurality of request parameters, the request parameters comprising: the plurality of datatype-specific initialization vectors, and the salt; and
render the log access credentials generated by the log application for display on the client device, to enable a user of the client device to control access to encrypted portions of the log data.

16. The non-transitory computer-readable medium of claim 15, wherein the network service requires log access credentials to decrypt and view the encrypted portions of the log data that are encrypted using the plurality of datatype-specific initialization vectors and the salt, and the request to submit the log data lacks the log access credentials.

17. The non-transitory computer-readable medium of claim 15, wherein the cryptographic data further comprises a key derivation function, a specified number of iterations, and a key length.

18. The non-transitory computer-readable medium of claim 15, wherein the instructions, when executed by the processor, cause the client device to at least:
generate a modified method, wherein the modified method replaces the parameter using a datatype-specific annotation and provides the parameter as a separate argument to the method.

19. The non-transitory computer-readable medium of claim 15, wherein the parameter is encrypted based on: a symmetrical algorithm, and a cryptographic key.

20. The non-transitory computer-readable medium of claim 15, wherein the instructions, when executed by the processor, cause the client device to at least:
identify, by the log application, a user selection of a user interface element to update the log access credentials; and
generate, by the log application, an updated log access credential and updated cryptographic data corresponding to the updated log access credential, wherein decryption and viewing of log data provided after generation of the updated log access credential requires the updated log access credential.

* * * * *